United States Patent [19]

Worden

[11] 3,923,897

[45] Dec. 2, 1975

[54] PRODUCTION OF HOPLIKE BEVERAGE BITTERING MATERIALS

[75] Inventor: Leonard R. Worden, Kalamazoo, Mich.

[73] Assignee: Kalamazoo Spice Extraction Company, Kalamazoo, Mich.

[22] Filed: Apr. 2, 1973

[21] Appl. No.: 346,741

[52] U.S. Cl............ 260/586 D; 260/586 P; 426/349
[51] Int. Cl.$^2$..................... C07C 45/16; C07C 45/00
[58] Field of Search......................... 260/586 R, 587

[56] References Cited
UNITED STATES PATENTS

| | | |
|---|---|---|
| 3,536,762 | 10/1970 | Ashurst et al.................... 260/586 R |
| 3,552,975 | 1/1971 | Worden et al............. 260/586 R X |
| 3,686,316 | 8/1972 | Verzele........................... 260/586 R |

FOREIGN PATENTS OR APPLICATIONS

| | | |
|---|---|---|
| 1,266,716 | 3/1972 | United Kingdom............ 260/586 R |
| 782,900 | 5/1972 | Belgium.......................... 260/586 R |

OTHER PUBLICATIONS

Wollmer, "Berichte," 58:672–678, (1925).

*Primary Examiner*—Norman Morgenstern
*Attorney, Agent, or Firm*—Gordon W. Hueschen

[57] ABSTRACT

Production of hoplike beverage bittering materials by the peracid oxidation of 3',5'-dialkyl-2',4',6'-trihydroxyacylphenones to 6-acyl-2,4-dialkyl-2-hydroxycyclohexane-1,3,5-triones (tetrahydrohumulones or tetrahydro-alpha acids) and isomerization thereof to 2,4-diacyl-5-alkyl-4-hydroxycyclopentane-1,3-diones (tetrahydroisohumulones or tetrahydroiso-alpha acids).

15 Claims, No Drawings

PRODUCTION OF HOPLIKE BEVERAGE BITTERING MATERIALS

BACKGROUND OF INVENTION

1. Field of Invention

Beer and like beverage bittering additives, intermediates therefor, tetrahydroisohumulones (III) and tetrahydrohumulone (II) intermediates therefor, production thereof. Particularly production of II by oxidation of desoxytetrahydro-alpha acids.

2. Prior Art

Pertinent references known to me are identified in the following:

1. U.S. Pat. No. 3,486,906 of P. H. Todd, Jr.
2. U.S. Pat. No. 3,522,975 of L. R. Worden and P. H. Todd, Jr.
3. L. F. Fieser and M. Fieser, "Reagents for Organic Synthesis", John Wiley and Sons, Inc., New York, New York, 1969, p. 458.
4. G. B. Payne, Organic Synthesis 42, 77 (1962).
5. P. H. Todd, P. A. Johnson, and L R. Worden, *Master Brewers Assn. Quart.* 9, 31 (1972).
6. W. Wöllmer, *Berichte* 58, 672 (1925).
7. British Pat. No. 1,266,716 (1972) of Shannon & Donnelly.
8. Belgian Pat. No. 782,900 of P. H. Todd, Jr.
9. M. Collins, D. R. J. Laws, and J. D. McGuinness, *J.Chem.Soc.* (C), 3814 (1971).
10. E. Byrne and S. J. Shaw, *J. Chem. Soc.* (C), 2810 (1971)

The most pertinent references as to the oxidation of desoxytetrahydro-alpha acids to tetrahydro-alpha acids are References (6), (7), and (10). The most pertinent reference as to isomerization of alpha acids to iso-alpha acids is Reference (8).

In classical methods of producing malt beverages with whole hops, most of the beta-acid fraction is lost during wort boil due to its low solubility and high chemical stability. Only small amounts of beta acid-derived substances such as hulupones can be found in 25—These are of low bittering and flavoring power and, therefore, the beta acid fraction of hops is mostly lost to the brewing process. The alpha acids fraction, while almost equally insoluble, is not chemically stable in boiling wort and isomerizes to the much more soluble and highly bitter iso-alpha acids that are so characteristic of beer flavor. Thus, while alpha acids are utilized as a source of flavoring materials in the classical brewing process, beta acids are utilized little if at all. However, the utilization even of alpha acids is poor and is of the order of only 15–35%, presumably because of difficulties in extraction of alpha acids from the hop cones by boiling wort. Solvent extraction or powdering of hops raises the alpha acids utilization somewhat, but still gives rather unsatisfactory utilization, probably because of lack of solubility of alpha acids in wort. Conversion of the solvent extract into an isomerized extract that is added to the wort boil raises the utilization of alpha acids to 50–60%, whereas preparation of a highly purified iso-alpha acids fraction that can be added post-fermentation or post-final filtration raises the utilization to about 80–90%.

To increase the utilization of hop bittering materials further, bittering materials must be obtained from sources other than alpha acids. In the production of iso-alpha acids from hops by solvent extraction thereof, as practiced by an increasing segment of the brewing industry today, the beta acid fraction is produced as a by-product and ordinarily is discarded. Recently (1971) a series of chemical transformations was reported [Reference (2)] whereby the beta acids fraction can be converted into various flavoring materials in the alpha acids family.

This transformation of natural beta acids to compounds in the alpha acids family not only provides an entirely new source of bittering materials for use in beer, thus greatly increasing the potential value and utilization of hops, but also provides for the first time entirely light-stable bittering materials [e.g., compound III, $R^2 = R^3 = -CH_2CH_2CH(CH_3)_2$], with no tendency to develop mercaptan or "skunklike" aromas.

Although it is well known that the so-called rho or dihydroiso-alpha acids produced by borohydride reduction of iso-alpha acids are relatively light-stable, these compounds still retain residual capacity for developing mercaptan aromas. Experimental evidence and a theoretical explanation for the absolute light-stability of tetrahydroiso-alpha acids as compared with the only relative light-stability of rho iso-alpha acids has been summarized recently in a paper by Todd, Johnson and Worden [Reference (5)]. That same paper reported that, whereas rho iso-alpha acids are only about 70% as bitter as iso-alpha acids, the tetrahydroiso-alpha acids (III) are about twice as bitter as iso-alpha acids. This higher level of bitterness further increases the flavoring potential that can be derived from the heretofore-discarded beta acids fraction.

The basic three-step conversion of beta acids to useful tetrahydroiso-alpha acids is described in Reference (2). The synthesis involves: (Step 1) hydrogenolysis of beta acids to form desoxy-alpha acids; (Step 2) oxidation of desoxyalpha acids [with lead (II) acetate] to form tetrahydro-alpha acids; (Step 3) isomerization of tetrahydro-alpha acids (II) in hot aqueous alkaline media to form tetrahydroiso-alpha acids (III). The same patent further describes reduction of tetrahydro-iso-alpha acids to hexahydroiso-alpha acids, bittering agents of unique stability.

The subject of the present invention is depicted in Chart 1. It is an entirely novel and far superior process for carrying out the conversion of desoxytetrahydro-alpha acids (I) to tetrahydro-alpha acids (II).

In one of the earliest studies on chemical transformation of beta acids, Wollmer [Reference (6)] effected this transformation in a multi-step process involving lead(II) acetate and oxygen. To a solution of the desoxy-compounds (I) in methanol was added lead(II)acetate, and the resulting solution was shaken under oxygen until oxygen uptake ceased (about 1 day), during which time the lead salt of tetrahydro-alpha acids precipitated in 55% yield. Evaporation in air of the mother liquid furnished additional lead salt to raise the yield to 78%. The combined salts were purified by repeated precipitation from methanol, and then tetrahydro-alpha acids (II) were regenerated in 61% overall yield from the desoxy material (I). It is essentially this process that even now is the only reported method for carrying out the oxidation step. This process is obviously unsatisfactory for large-scale, commercial production.

The process was considerably improved as reported in U.S. Pat. No. 3,552,975 [Reference (2)] by elimination of the isolation and purification (of the lead salt) steps. However, even though this change allowed a higher yield of tetrahydro-alpha acids (II) to be isolated, later, more definitive examination of the product showed it to be a still quite crude mixture which required further extensive purification. Moreover, residues of lead could only be removed with great difficulty. Thus, the lead (II)-oxygen oxidation process, even as improved, is a comparatively poor one, but the only one available until the process of the present invention.

At least one report has described the attempted elimination of lead acetate. Byrne and Shaw [Reference (10)] attempted to oxidize a solution of desoxy compounds with bubbling air and found that this oxidation method produced an undefined mixture of gums as well as a low (43%) yield of desired end product (iso-alpha acids). Their results demonstrate the susceptibility of tetrahydro-alpha acids, presumably formed from desoxy compounds, to oxidation when not protected by lead, and renders more surprising the yields attainable by the present invention.

The stability of the alpha acids formed by the lead(II) acetate oxidation can be attributed to their complexing with the lead and thereby inactivating the oxidative sites on the alpha acid molecule, which is an explanation of why the lead acetate procedure has remained the procedure of preference until this time.

A very recent example illustrates the continued problems associated with lead(II) oxidation. Shannon and Donnelly [Reference (7)] in their synthesis of crystalline cis- and trans- tetrahydro-isohumulone, had to be content with a 51% yield in the oxidation step carried out with the classical oxygen stream in the presence of lead(II) acetate.

SUMMARY OF THE INVENTION

The present invention relates to hop flavors for malt beverages and the like, production thereof, and utilization thereof in the flavoring of beverages, and is especially concerned with the production and use thereof as well as improvements in the process of producing certain known hop flavor compositions and intermediates in the preparation thereof.

The present invention, in brief, provides a greatly improved process for producing tetrahydrohumulones from desoxytetrahydro-alpha acids by oxidation using a peracid, and optional isomerization of the thus-produced tetrahydrohumulones to the corresponding tetrahydroisohumulone, without isolation of the intermediate tetrahydrohumulone, if desired. Yields are quantitative in the oxidation step and are also quantitative in the isomerization step, whether calculated based upon the intermediate tetrahydrohumulone oxidation product or upon the starting desoxytetrahydro-alpha acid starting material.

OBJECTS

It is an object of the present invention to provide an improved single-step oxidation process as above-identified. It is a further object of the present invention to provide an improved and advantageous two-step process as above-identified. It is an additional object of the invention to provide an improved method for the provision of hop flavors for malt beverages and the like, especially such a process which enables the employment of substances derived from beta acids as starting materials in the process. Additional objects will become apparent hereinafter and still other objects will be obvious to one skilled in the art.

THE INVENTION

It has now been found that peracids, especially peracetic acid, without the presence of lead, can be employed to selectively oxidize desoxy-alpha acids (I) to alpha acids (II) without the formation of by-products. In the case of peracetic acid, yields are quantitative, which establishes the specificity of the attack of the peracetic acid on the 3-position of the desoxy-alpha acids. Thus, not only is it surprising that the oxidation stops at the alpha acid stage and does not continue to form undefined gums and resins [as is the case even under the relatively mild conditions of lead(II) acetate plus oxygen], but it is unexpectedly specific as to the site of oxidation in the molecule. The yield is vastly superior to that achieved by the conventional lead(II) acetate process in which the site of oxidation may be directed by the lead ion and in which the alpha acid is undoubtedly protected from further oxidation by the formation of the lead-alpha acid complex.

It should be pointed out that both the specificity and high yield of desired product using peracids can be obtained in a reaction conducted at ambient or slightly elevated temperatures in one hour or less, whereas the conventional lead(II) acetate oxidation usually requires nine to twelve hours. Thus, a quantitative yield may be achieved using the method of the present invention in spite of the fact that the oxidation process is much more vigorous than the conventional one, as indicated by the speed of reaction. The time advantage resulting from such a vigorous oxidation process is moreover not lost due to a necessary removal of excess acid or peracid as soon as the reaction is complete. This would be required if the oxidizing agent were capable of oxidizing the desired product further, but is unnecessary according to the present process. Again, unless the reaction were so specific and so conveniently carried out, it would not be readily adaptable to commercial operation. However, one of the greatest advantages of the process of the present invention, besides its high yield, is its ready application to commercial conditions.

A further advantage of the present invention is that it will not cause oxidation and loss if alpha acids and/or iso-alpha acids are present while the oxidation of the desoxy compounds is taking place, as would occur when operating according to prior art procedure.

Another advantage of this invention is that it may be combined with the process of Todd [Reference (8)], which teaches the isomerization of alpha acids to iso-alpha acids in a water-immiscible solvent, as an essentially continuous process without isolation of intermediates. This advantage is portrayed in Example 2, and many variations will immediately become apparent to those skilled in the art. The combined process comprises adding the peracid to a solution of the desoxy-alpha acid (I) in a water-immiscible solvent such as methylene chloride, waiting until the oxidation is complete, adding water and alkali and a polyvalent metal ion such as calcium, agitating and raising the pH to above about 7, and effecting the isomerization of the alpha acid to iso-alpha acid. The effect of so simplifying the procedure over the conventional lead(II) acetate process, with the need to regenerage the alpha acid from the lead complex and remove all traces of lead, is obvious. Other advantages are many, including the elimination of separate vessels for the two distinct reactions, the exceptionally high yields in both steps, and the ability to carry out the oxidation in the presence of any alpha and iso-alpha acids which may be present together with the desoxy compounds, always to produce a high yield and recovery of the desired alpha acid product and iso-alpha acid product, if the oxidation is combined with the subsequent isomerization step.

Oxidation can be achieved with as much as 2.5 molar equivalents of peracetic acid in acetic acid without creation of undesirable by-products. The reaction is mildly exothermic and stops of its own accord after the introduction of one hydroxyl group on the ring. The product is the desired hydroxycyclohexane-1,3,5-trione (II) and is obtained in quantitative yield. Alpha and iso-alpha acids may be present and are not affected. That this surprising and exciting result is reproducible has been verified by large-scale pilot plant trial. Excess peracid is removed at any convenient time following completion of the reaction, or is neutralized if the reaction medium is taken into the isomerization step directly.

The present method of oxidation now makes it possible for the step or steps depicted in Chart 1 to be carried out quantitatively on a large scale. Since U.S. Pat. No. 3,552,975 [Reference (2)] reported conditions under which hydrogenolysis can be carried out quantitatively, and since isomerization can be carried out quantitatively under mild conditions, it is now possible and feasible to convert the heretofore-discarded beta acids by-product of the hops extraction process in virtually 100% overall yield into tetrahydroiso-alpha acids (III), flavoring materials that by virtue of their absolute light-stability and increased bitterness are far superior to the iso-alpha acids currently used to flavor most malt beverages.

Although peracetic acid is the preferred oxidizing acid, other peracids, such as perbenzoic and monoperphthalic (see Examples 2 and 3) may also be used.

The surprising specificity of peracids is highlighted not only by the yield improvement over the previous art, but by the observations that Milas' reagent, a mixture of osmium tetroxide and hydrogen peroxide, provides only a poor yield of the desired compounds.

Although perbenzoic acid, monoperphthalic acid, and peracids in general furnish the desired product (II) in high yield, the convenience and ready commercial availability of peracetic acid in acetic acid as well as the relatively simple work-up procedure when employing this reagent makes it the reagent of choice. It is immaterial whether the peracid is generated in situ by addition of hydrogen peroxide to the carboxylic acid, or if the peracid is preformed.

When the isomerization is included as the second step of the process, isomerization of the alpha acids (II) to iso-alpha acids (III) is carried out in a water-immiscible solvent, at temperatures which can be well below 50°C., and which are usually below 45°C., ordinarily at ambient or room temperatures. [This isomerization step broadly was Step 3 in Reference (2)]. Since the prior art expertise before Todd [Reference (8)] considered it necessary to dissolve the alpha acids in water, or in water and a co-solvent (or "coupling agent") such as ethanol, and elevate the temperature to 80°–100°C. in order to achieve the desired isomerization, such isomerization step is a radical and highly advantageous departure from the prior art, especially now that it has been found that it can be conducted directly from the oxidation step, without isolation of intermediate product (II), with practically quantitative yields of desired product (III) based upon either starting material (I) or (II), and without separation of water-immiscible organic solvent or any other reagent or reaction product.

Such procedure for transforming the tetrahydroalpha acid (II) into an iso-alpha acid (III) involves contact of an aqueous solution of the metal ion with a water-immiscible organic solvent solution of the alpha acid (II) under conditions whereunder the alpha acid (II) remains dissolved in said organic solvent. This procedure effects the desired isomerization in the water-immiscible organic solvent without prior separation of said solvent containing alpha acid (II) from the previous oxidation step. The solvent is preferably selected from the class consisting of methylene chloride, ethylene dichloride, dichloroethane, trichloroethylene, and chloroform, but need only be water-immiscible; the temperature can be and conveniently is below about 50°C.; the pH of the water phase is maintained above about 7, preferably at least 8.0 and preferably 13.0 or below, so the alpha acid is present in the non-aqueous phase, and substantially absent from the aqueous phase, so that isomerization occurs in the non-aqueous solvent; preferably a metal ion selected from the group consisting of calcium and magnesium ions is present; preferably the calcium ion is employed; the mixture is held until isomerization occurs, and the solvent then removed; and metal ions are preferably removed by washing the product contained in the solvent with dilute acid prior to removal of the solvent. Other details may be as further described in Reference (8).

CHART I: Conversion of beta acids into flavoring materials in the tetrahydro-alpha acids family

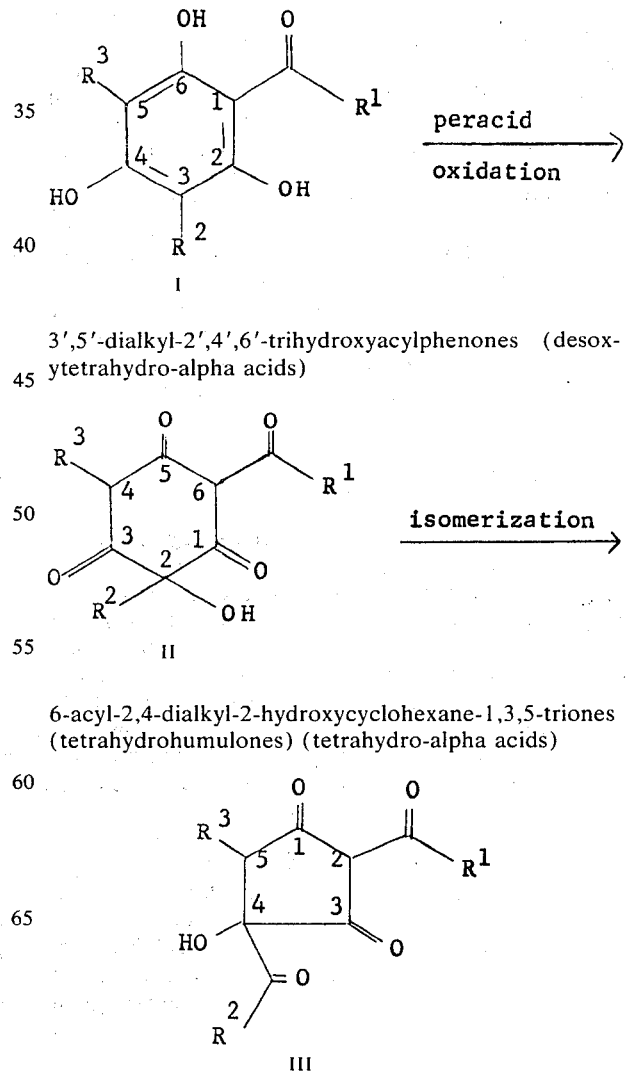

3',5'-dialkyl-2',4',6'-trihydroxyacylphenones (desoxytetrahydro-alpha acids)

6-acyl-2,4-dialkyl-2-hydroxycyclohexane-1,3,5-triones (tetrahydrohumulones) (tetrahydro-alpha acids)

2,4-diacyl-5-alkyl-4-hydroxycyclopentane-1,3-diones (tetrahydroiso-alpha acids) (tetrahydroisohumulones) $R^1$, $R^2$, and $R^3$ are various alkyl groups which may or may not be identical, e.g., in the formulas above, if $R^2 = R^3 =CH_2CH_2CH(CH_3)_2 =$ isopentyl and $R^1 = -CH_2CH(CH_3)_2 =$ isobutyl, the compound I becomes desoxytetrahydrohumulone = 3′,5′-diisopentyl-2′,4′,6′-trihydroxyisovalerophenone and III becomes tetrahydroisohumulone.

Similarly, when $R^2$ and $R^3$ are isopentyl and $R^1$ is $-CH(CH_3)CH_2CH_3$ or $-CH(CH_3)_2$, the starting material (I) is respectively desoxytetrahydroadhumulone and desoxytetrahydrocohumulone, the intermediates II become tetrahydroadhumulone and tetrahydrocohumulone, and the end products III become tetrahydroisoadhumulone and tetrahydroisocohumulone.

For clarity, it should be stated here that desoxytetrahydro-alpha acids are herein designated by I and may also be designated a 3′,5′-dialkyl-2′,4′,6′-trihydroxyacylphenone, that the intermediate tetrahydrohumulone is herein designated by II and may also be designated a tetrahydro-alpha acid or a 6-acyl-2,4-dialkyl-2-hydroxycyclohexane-1,3,5-trione, and that the ultimate end product, the tetrahydroisohumulone, is herein designated III and may sometimes be designated a tetrahydroiso-alpha acid or a 2,4-diacyl-5-alkyl-4-hydroxycyclopentane-1,3-dione. Moreover, sometimes the terms "alpha acids" and "iso-alpha acids" are employed herein without the "tetrahydro" prefix, without any intention, however, to define a different material when such abbreviation is employed. Such abbreviation, when employed, will be apparent to one skilled in the art. To conform with current nomenclature practice, lupulones are usually referred to herein as beta acids; tetrahydrohumulones (II) as tetrahydro-alpha acids; and tetrahydroisohumulones (III) as tetrahydroiso-alpha acids. It should be recognized, however, that the terms alpha acids, "beta acids," and "iso-alpha acids" are used herein in a generic sense and are not meant to limit the various alkyl groups $R^1$, $R^2$, and $R^3$ (Chart I) to groups found in naturally-occurring substances, the present invention being equally applicable to synthetically derived materials.

DETAILED DESCRIPTION OF THE INVENTION

The following Examples are given by way of illustration only, and are not to be construed as limiting. Furthermore, although, unless otherwise specified, the Examples refer to $R^2 = R^3 = -CH_2CH_2CH(CH_3)_2$ and $R^1 =$ one of or a mixture of the alkyl groups found at that position in natural products, this procedure is intended to cover application to desoxy alpha acids having $R^1$ alkyl groups containing up to and including eight carbon atoms and $R^2$ and $R^3$ alkyl groups of any type, such as can be derived from allyl or substituted allyl groups in naturally-occurring or synthetic beta acids, again containing up to and including 8 carbon atoms. The starting material for the synthetic work in some cases was derived from highly purified crystalline beta acids, whereas in other cases it was derived from a gum rich in beta acids, prepared by removal of most of the alpha acids from that portion of a non-aqueous solvent hop extract which was soluble in water of pH greater than 10. Desoxytetrahydro-alpha acids (I) obtained from non hop-derived members of the beta acid family, which may be prepared, for example, according to References (7) and (9), may of course also be used as starting materials, as shown in the Examples.

EXAMPLE 1

Oxidation with Peracetic Acid followed by Isomerization

To 1.05 g of the phenol (I), in this case consisting of hop-derived desoxytetrahydro-alpha acids, is added a solution of 9 ml of acetic acid and 0.1 ml of sulfuric acid. When the phenol is completely dissolved, 0.85 ml of 30% hydrogen peroxide is added and the mixture stirred briefly. A slow temperature rise is noted. The temperature is prevented from rising above 30°C. by occasional brief partial immersion of the reaction flask in tap water. After 40 minutes the temperature begins to fall spontaneously. Thin layer chromatography of a small portion of the reaction mixture on silica gel G (elution with hexane-ethyl acetate, 3-1, followed by a 1% ferric chloride spray) indicates the starting material to be gone completely and the product to be tetrahydro-alpha acids (II) with the same $R_f$ value as that of the same compound (II) produced from the same starting material by the classical lead (II)-oxygen oxidation procedure. The reaction mixture is added to 11 ml each of water and methylene chloride and equilibrated. The organic layer is washed with 11 ml of water, separated, and dried with anhydrous, powdered sodium sulfate. The original aqueous layer and the wash solution are extracted again with 11 ml of methylene chloride. The two dried methylene chloride layers are combined and evaporated (rotary evaporator) to give 1.09 g (99%) of tetrahydro-alpha acid (II) as a pale yellow viscous oil of maximum wave length (alkaline methanol) 231, 322, and ca. 356 nm (shoulder).

The product is isomerized in methylene chloride, using calcium chloride and aqueous sodium hydroxide, to furnish 1.08 g (99%) of tetrahydroiso-alpha acids (II) as an amber syrup of maximum wave length (alkaline methanol) 253 nm ($E_{1cm}^{1\%}$ 418) and ca. 270 nm (358) (shoulder). This material is purified by countercurrent extraction with negligible weight loss to give tetrahydro-iso-alpha acids of maximum wave length (alkaline methanol) 253 nm ($E_{1cm}^{1\%}$ 480). This material is injected post-fermentation into beer with no visible haze when the resulting beer is observed in a glass and compared with controls. Not only is the appearance of the beer satisfactory, but the flavor is entirely satisfactory and possesses the expected level of pleasant bitterness even though flavored at only half the level customary with iso-alpha acids. In addition, an improvement in both foam stability and foam adhesion is noted in the beer flavored with the tetrahydro iso-alpha acids.

The foregoing is not intended to be limiting and is offered by way of illustration only. Many parameters can be varied in ways that will be obvious to those skilled in the art. For example, peracetic acid need not be generated in situ but can be purchased already prepared, and the reaction can be conducted in any solvent compatible with peracids. The peracid is not limited to peracetic acid or even to peralkanoic acids, but can be any peracid. Examples of the use of two other peracids are given in the following. The relative molar quantities of the phenol (I) and peracid can be varied drastically since the spontaneous reaction ceases after attack of 1 molar equivalent of peracid, despite the presence of excesses thereof. The temperature limits in the Example are purely arbitrary. The temperature is not critical and can be varied considerably as long as it is neither so low as to quench the reaction nor so high as to cause the reaction to race out of control.

EXAMPLE 2

Oxidation with Peracetic Acid followed by Isomerization

Desoxytetrahydrohumulone (a specific alpha acid) (1.92 g, 0.0061 mole) is dissolved in 30 ml of methylene chloride in a three-neck round bottom flask equipped with a thermometer, reflux condenser, and an addition funnel. To the foregoing solution, 1.28 g of 40% peracetic acid solution in 20 ml of methylene chloride is added dropwise (the ratio of peracetic acid to desoxytetrahydrohumulone is 1.1:1.0). The reaction is slightly exothermic. After addition, the reaction is allowed to stir at room temperature for one-half hour. Tap water (40 ml) and 5 ml of 20% calcium chloride solution are added, and the pH is raised to 11.0. The solution is stirred and then allowed to stand overnight without agitation. In the morning, the solution is acidified, the water discarded, and the methylene chloride layer washed twice with 0.2N hydrochloric acid. The solvent is removed under vacuum, and 1.90 g (95% yield overall for the two steps) of tetrahydroisohumulone is recovered. The purity is the same as that obtained in Example 1.

The iso-alpha acid (III) may also be recovered as its metal salt or complex by removing the solvent without acidification or, if made from an impure starting material, may be purified to any desired degree by procedures already known to the art.

It is clear that other water-immiscible solvents such as ethylene dichloride, hexane, benzene, and ethyl acetate, which are not attacked by peracetic acid, are as acceptable as methylene chloride for this two-step series of reactions. Methylene chloride is the solvent of choice, however, since it is most readily evaporated from the product. Likewise, it should be pointed out that neither temperature, duration of reaction, nor amounts of reagents are critical, except that for economy and efficiency at least 1 mole of peracetic acid should be used per mole of desoxy-alpha acid. Neither an excess of peracetic acid nor greater or lesser amounts of solvent, water, or calcium chloride or other salt are critical, but the amounts may be any which are most convenient in commercial application. Likewise, pH during isomerization is not critical, recognizing only that the isomerization proceeds most rapidly at a pH of above 7. It may conveniently be as low as 7 or as high as 12. Further, the temperature is not critical in that both steps may be conducted conveniently in a temperature range of 10° to 40°C., recognizing, of course, that both reactions will proceed more quickly as the temperature is increased. Since both reactions are sufficiently rapid at ambient temperatures, it is preferred that they be so conducted.

As will be recognized, a somewhat less-preferred embodiment of the invention is to perform the oxidation in a water-soluble solvent, such as acetic acid, which must then subsequently be neutralized or removed if isomerization is to be carried out.

It is clear from the foregoing Example that it is not necessary to perform any operation on the water-immiscible solvent-trione-acetic acid solution following completion of oxidation, if isomerization is intended. It is necessary only to adjust the pH, add the preferred metal ion, and proceed with the isomerization. Of course, it is possible to wash out the peracid residue, and separate reaction products prior to isomerization, but this is not necessary. Therefore, an important commercial advantage of this invention is the ability to proceed directly from oxidation through isomerization without removing solvents or reagents.

Thus, when compared with the cumbersome procedures heretofore known to the art, this invention also provides a two-step process of remarkable simplicity and ease, offering quantitative yields in both of the two steps, and with negligible hazard. In short, it makes the conversion of beta acids to valuable tetrahydroiso-alpha acids (III) commercially feasible.

EXAMPLE 3

Oxidation with Perbenzoic Acid and Isomerization

To a stirred solution of 1.05 g of a mixture of desoxyalpha acids (I) derived from hops in 2 ml of benzene maintained at 9°C. is added 8.5 ml of benzene containing 3.04 mmol of perbenzoic acid prepared as described in L. F. Fieser and M. Fieser, "Reagents for Organic Synthesis" [Reference (3)], with the exception that 50% rather than 70% hydrogen peroxide is employed. The temperature of the solution rises to 20°C. but is quickly cooled to 10°C. After 1 hour, the reaction mixture is extracted with water at a pH of 11. Calcium chloride and methylene chloride are added to the water extract, and the tetrahydro-alpha acids (II) are isomerized overnight to give tetrahydroiso-alpha acids (III) with the typical maximum wave length (alkaline methanol) of 251 nm.

This Example shows that the alpha acid may be totally removed from the oxidation solvent and subsequently isomerized in a different solvent. However, it is obviously preferable to continue the sequence of reactions in the same solvent, as in Example 2.

EXAMPLE 4

Oxidation with Monoperphthalic Acid

To a stirred solution of 1.05 g of the phenol (I) (in this case desoxy-alpha acids derived from hops) in 2 ml of ether is added 8.2 ml of ether containing 3.0 mmole of monoperphthalic acid prepared according to Payne [Reference (4)]. The immediate temperature rise is halted at 28°C. with a water bath. When the temperature begins to fall, precipitated phthalic acid is removed by filtration and the reaction mixture extracted with several portions of very dilute aqueous sodium hydroxide. The combined extracts are extracted several times at pH 9.6 with methylene chloride, and the tetrahydro-alpha acids extracted by the methylene chloride are isomerized as in Examples 1 and 2 to provide tetrahydroiso-alpha acids with the typical highly characteristic ultraviolet spectrum in alkaline methanol.

The above two examples show that peracids in general may be used, and that a variety of solvents may be used for the oxidation, just as a variety of solvents may be used for the isomerization step. Chlorinated solvents, and especially trichloroethylene, ethylene dichloride, and methylene chloride, are preferred solvents because of their low toxicity and low flammability.

EXAMPLE 5

Production of Alpha Acid from Non Hop-Derived Desoxy Alpha Acid

One-half gram of 3',5'-dihexyl-2',4',6'-trihydroxyhexanoylphenone (a synthetic desoxy-alpha acid synthesized according to Collins, Laws, and McGuinness [Reference (9)]) is dissolved in 30 ml of methylene chloride in a 150-ml beaker, and 1.4 g. of 40% peracetic acid solution dissolved in 20 ml of methylene chloride is added thereto, keeping the temperature below 30°C. in a water bath. Following completion of addition, the mixture is allowed to stand for 40 minutes and the entire mixture then transferred to a separatory funnel and extracted 3 times with water and once with 1% aqueous sodium bicarbonate. The methylene chloride is removed in vacuo, and 0.51 g (98%) of 6-hexanoyl-2,4-dihexyl-2-hydroxycyclohexane-1,3,5-trione (tetrahydro-alpha acid), having a typical alpha acid alkaline ultraviolet spectrum, is isolated.

EXAMPLE 6

Production of Alpha Acid from Non Hop-Derived Desoxy-Alpha Acid

To 1.50 g. of 3',5'-dipropyl-2',4',6'-trihydroxypropiophenone (a desoxy-alpha acid derived from 2,2,4-triallyl-6-propionylcyclohexane-1,3,5-trione), a beta acid synthesized by Collins, Laws, and McGuinness [Reference (9)], dissolved in 30 ml of methylene chloride, is added 6 g of 40% peracetic acid in 15 ml of methylene chloride, the temperature being maintained below 30°C. The mixture is allowed to stand for 30 minutes following completion of addition, whereafter 1.49 g (94%) of 6-propionyl-2,4-dipropyl-2-hydroxycyclohexane-1,3,5-trione (a tetrahydro-alpha acid) is obtained by the procedure of the foregoing Example.

The previous two Examples demonstrate the application of this invention to non hop-derived desoxy-alpha acids.

EXAMPLE 7

Production of Tetrahydroisohumulone from 3',5'-diisopentyl-2',4',6'-trihydroxyisovalerophenone In exactly the same manner as set forth in Example 2, but starting from very pure isolated 3',5'-diisopentyl-2',4',6'-trihydroxyisovalerophenone, the desired tetrahydroisohumulone is obtained in quantitative yields and is characterized by extremely satisfactory beverage bittering properties and stability.

EXAMPLE 8

Production of Tetrahydroisoadhumulone from 3',5'-diisopentyl-2',4',6'-trihydroxy-2-methylbutyrophenone In exactly the same manner as set forth in Example 2, but starting from the pure isolated 3',5'-diisopentyl-2', 4', 6'-trihydroxy-2-methylbutyrophenone, the desired tetrahydroisoadhumulone is obtained in quantitative yields and is characterized by extremely satisfactory beverage bittering properties and stability.

EXAMPLE 9

Production of Tetrahydroisocohumulone from 3',5'-diisopentyl-2',4',6'-trihydroxyisobutyrophenone In exactly the same manner as set forth in Example 2, but starting from the pure isolated 3',5'-diisopentyl-2',-4',6'-trihydroxyisobutyrophenone, the desired tetrahydroisocohumulone is obtained in quantitative yields and the product found to have the desired highly advantageous beverage bittering properties and stability.

It is to be understood that the invention is not to be limited to the exact details of operation or exact compounds, compositions, methods, or procedures shown and described, as many modifications and equivalents of the process illustrated in the foregoing will be apparent to one skilled in the art and may be made in the method and procedure of the present invention without departing from the spirit or scope thereof.

We claim:

1. The process for the oxidation of a 3',5'-dialkyl-2',-4',6'-trihydroxyalkanoylphenone to a 6-alkanoyl-2,4-dialkyl-2-hydroxycyclohexane-1,3,5-trione, an alpha acid, said alkanoyl and alkyl groups containing a maximum of 8 carbon atoms, comprising the step of contacting an organic peracid oxidizing agent with the starting 3',5'-dialkyl-2',4',6'-trihydroxyalkanoylphenone in the liquid phase to produce said 6-alkanoyl-2,4-dialkyl-2-hydroxycyclohexane-1,3,5-trione.

2. A process of claim 1 which utilizes peracetic acid as oxidizing agent.

3. A process of claim 1 which utilizes perbenzoic acid as oxidizing agent.

4. A process of claim 1 which utilizes monoperphthalic acid as oxidizing agent.

5. A process of claim 1 in which both alpha acids and iso-alpha acids are present at the start of the reaction.

6. The process of claim 1 wherein the oxidation is carried out in a water-immiscible organic solvent.

7. A process of claim 1 which further includes the production of a 2,4-dialkanoyl-5-alkyl-4-hydroxycyclopentane-1,3-dione as iso-alpha acid, by carrying out said oxidation of said phenone with a peracid in the presence of a water-immiscible organic solvent, and isomerizing the said thus-formed trione, an alpha acid, into an iso-alpha acid without isolation of the trione by adding sufficient salt of a metal, selected from the group consisting of sodium, potassium, manganese, nickel, cerium, and Group IIA and Group IIB elements of the Periodic Table, to maintain the alpha acid in the water-immiscible organic solvent, the pH being maintained at 13 or below.

8. A process of claim 7 which utilizes peracetic acid as oxidizing agent.

9. A process of claim 7 in which a metal ion taken from the class consisting of calcium and magnesium is present during the isomerization.

10. A process of claim 7 comprising carrying out the said oxidation of said phenone with a peracid in the presence of a water-immiscible solvent, and isomerizing the thus-formed trione at a pH above about 7 without removal of water-immiscible solvent.

11. A process of claim 10 comprising the step of conducting the oxidation using a peracid in the presence of a water-immiscible solvent and, after said conversion, adjusting the pH to above about 7 in the presence of sufficient metal ion to drive the 6-alkanoyl-2,4-dialkyl-2-hydroxycyclohexane-1,3,5-trione-alpha acid product into the water-immiscible solvent, holding the mixture until the alpha acid has isomerized to an iso-alpha acid, and separating the iso-alpha acid or a metal complex thereof from the solvent.

12. A process of claim 10 in which the peracid is peracetic acid.

13. A process of claim 10 in which the solvent is taken from the class consisting of methylene chloride, ethylene dichloride, and trichloroethylene.

14. A process of claim 10 in which the metal ion is a polyvalent metal ion taken from the class consisting of calcium and magnesium.

15. A process of claim 14 in which the iso-alpha acid is subsequently treated with acid to substantially remove metal ions.

* * * * *